(12) United States Patent
Hengst et al.

(10) Patent No.: US 7,133,200 B2
(45) Date of Patent: Nov. 7, 2006

(54) METHOD AND DEVICE FOR FOCUSING AND DIOPTER COMPENSATION OF A TELESCOPE

(75) Inventors: Alfred Hengst, Lahnau (DE); Gernot Kettler, Nürnberg (DE); Sigrun Kammans, Herborn (DE)

(73) Assignee: Leica Camera AG, Solms (DE)

( * ) Notice: Subject to any disclaimer, the term of this patent is extended or adjusted under 35 U.S.C. 154(b) by 131 days.

(21) Appl. No.: 10/486,579

(22) PCT Filed: Aug. 10, 2002

(86) PCT No.: PCT/DE02/02950

§ 371 (c)(1),
(2), (4) Date: Feb. 11, 2004

(87) PCT Pub. No.: WO03/016978

PCT Pub. Date: Feb. 27, 2003

(65) Prior Publication Data

US 2004/0233522 A1 Nov. 25, 2004

(30) Foreign Application Priority Data

Aug. 15, 2001 (DE) ............................... 101 38 843

(51) Int. Cl.
*G02B 23/00* (2006.01)

(52) U.S. Cl. ...................................... 359/410

(58) Field of Classification Search ................. 359/410
See application file for complete search history.

(56) References Cited

U.S. PATENT DOCUMENTS

| 4,848,887 | A | * | 7/1989 | Addy et al. .................. 359/413 |
| 4,989,963 | A | | 2/1991 | Farnung et al. |
| 5,491,588 | A | | 2/1996 | Ogawa et al. |
| 5,504,624 | A | | 4/1996 | Kato |
| 5,583,692 | A | | 12/1996 | Funatsu |
| 5,969,858 | A | * | 10/1999 | Funatsu ...................... 359/407 |
| 6,134,048 | A | * | 10/2000 | Kato et al. .................. 359/407 |
| 6,412,958 | B1 | * | 7/2002 | Aikawa ....................... 359/600 |

FOREIGN PATENT DOCUMENTS

| DE | 1 694 491 U1 | 5/1954 |
| DE | 38 30 620 A1 | 3/1990 |
| DE | 42 44 161 A1 | 7/1993 |
| DE | 43 42 873 A1 | 12/1994 |
| DE | 196 34 179 A1 | 2/1997 |
| JP | 2000206420 A * | 7/2000 |

* cited by examiner

*Primary Examiner*—Drew A. Dunn
*Assistant Examiner*—Joshua L Pritchett
(74) *Attorney, Agent, or Firm*—Foley & Lardner LLP

(57) ABSTRACT

A monocular or binocular optical system that is capable of automatically adjusting a diopter setting upon or during a change in magnification in a way that acts to preserve focus and a corresponding method for adjusting a diopter setting to preserve focus upon or during a change in magnification.

10 Claims, 4 Drawing Sheets

METHOD AND DEVICE FOR FOCUSING AND DIOPTER COMPENSATION OF A TELESCOPE

The invention relates to a method for focusing and diopter compensation of a telescope and such a telescope, having an objective and a focusing element associated with the latter and displaceable by a focusing adjustment ring, whose basic position can be adjusted by a lockable diopter adjustment ring, and comprising an inverting system and an eyepiece.

Such a telescope is disclosed by DE 38 30 620 C2 and illustrated there in particular as a binocular telescope. The important feature of this telescope is a focusing element associated with the objective, which is used both for adjusting the range and also for diopter compensation. A focusing adjustment ring and a diopter adjustment ring can be unlocked from each other. In this position, the focusing element in each of the two telescopes can be adjusted independently of each other onto an object in accordance with the individual visual power of the two eyes for the purpose of sharp imaging. After the two adjustment rings have been locked, the focusing element in the two telescopes is displaced simultaneously by the same amounts in order to adjust to other object distances. The outwardly pointing lens elements of the objective and of the eyepiece are fixed with respect to the housing of the telescope so that the focusing adjustment and the diopter compensation are what is known as internal focusing.

DE 16 94 491 U1 likewise discloses a binocular telescope with internal focusing. Apart from the common adjustment of the two focusing elements, diopter compensation is also provided in one of the tubes. For this purpose, a diopter adjustment ring can be uncoupled from the focusing adjustment ring. As opposed to the aforementioned telescope, here, by actuating the focusing adjustment ring, first of all the focusing element in one tube has to be adjusted to an object for the purpose of definition and then the difference in vision of the other eye in the other tube is compensated for by uncoupling the diopter adjustment ring.

U.S. Pat. No. 5,491,588 A discloses an afocal telescope with continuous magnification changing. For the purpose of a magnification change, both a lens element associated with the objective and a lens element associated with the eyepiece are displaced. For the purpose of diopter compensation, the entire eyepiece, together with the lens element displaced during the magnification change, is additionally displaced along the optical axis. In the event of a change in magnification, it is necessary to refocus.

U.S. Pat. No. 5,504,624 A likewise discloses an afocal telescope with continuously variable magnification, in which the lens element associated with the eyepiece is displaced together with the lens element associated with the objective only for a magnification change. Diopter compensation is carried out via a separate eyepiece lens group by means of displacement along the optical axis. The mechanical complexity for the adjustment of the mutually coupled lens elements for the magnification change is considerable. The additional adjustment of the eyepiece for diopter compensation leads to a change in the length of the overall system.

DE 43 42 873 A1 discloses a telescope with two fixed eyepiece focal lengths. Changing the magnification is carried out by changing a lens element in the eyepiece region from a first position to a second position. Changes in the object range are compensated for by means of axial displacement of the eyepiece. The same applies to the defects in the eye of the observer, it being necessary for the eyepiece to be readjusted separately in the event of a change from one eyepiece magnification to the other. In this system, too, the overall length changes with the correct definition.

The finding which results from the aforementioned documents is that, in telescopes with variable eyepiece focal length, the elements for the diopter compensation must be arranged behind the magnification adjusting element in the direction of the light. This achieves the effect that the lens element responsible for the diopter compensation remains constant during the magnification adjustment.

By analogy with the term telescope magnification, in the following text, a magnification depending only on the eyepiece focal length will be designated an eyepiece magnification $\Gamma$ and an eyepiece with a variable focal length will be designated an eyepiece with variable magnification.

If, however, both the adjusting elements for the magnification change and the adjusting elements for the diopter compensation are arranged on the eyepiece, then problems result in the arrangement of a normally additionally further desired movable eyepiece cup for spectacle wearers and non-wearers. An eyepiece cup of this type additionally enlarges the overall volume of the eyepiece, as a result of which, in binocular telescopes, the adjustable eye spacing is limited at the bottom and the clearance for the nose of the user is restricted considerably.

The adjusting elements, which are necessarily located close beside each other at the eyepiece, make operation more difficult. Inadvertent displacement of one of the elements must be expected.

The invention was therefore based on the object, in a telescope having internal objective focusing and diopter compensation, of providing the possibility of changing the eyepiece magnification which permits a simple and compact configuration of the eyepiece and ensures the constancy of the diopter adjustment during a change of magnification.

According to the invention, in a method of the type mentioned at the beginning, this object is achieved by a method for focusing and diopter compensation in a telescope having an objective (3) and a focusing element (5) associated with the objective and displaceable by a focusing adjustment ring (12), whose basic position can be adjusted by a lockable diopter adjustment ring (13), and comprising an inverting system (4) and an eyepiece, wherein, when use is made of an eyepiece (6, 7, 8) with variable magnification, during a change in the magnification, the focusing element (5) is adjusted by a value dependent on the diopter adjustment and on the magnification change. One advantageous refinement results from starting from a diopter adjustment $z_1$ with an eyepiece magnification $\Gamma_1$, $z_2=(\Gamma_1/\Gamma_2)^2 * z_1$ is set as the diopter adjustment at an eyepiece magnification $\Gamma_2$.

The important step in order to achieve the set object is to be seen, in a focusing element associated with the objective, in addition to the adjustment for the diopter compensation, of additionally effecting an adjustment, dependent on the magnification change of the eyepiece, which keeps the definition constant during the change in the magnification. Starting from a diopter adjustment $z_1$ with an eyepiece magnification $\Gamma_1$, the diopter adjustment is to change to the value $z_2=(\Gamma_1/\Gamma_2)^2 * z_1$ at an eyepiece magnification $\Gamma_2$.

The specified relationship between the adjustment values $z_1$ and $z_2$ for the diopter compensation also applies in the case of a continuous change in the eyepiece magnification. It may be implemented mechanically via a cam disk but in particular when changing over the eyepiece magnification between a few discrete magnification values.

The displacement out of the eyepiece of the diopter adjustment, normally having to be performed on the eyepiece in the case of eyepieces with a variable focal length, relieves the eyepiece considerably from a constructional point of view. A variable optical element in the eyepiece is dispensed with, as a result of which additional problems in the optical design disappear. The freedom obtained can be used for improved optical performance. On the eyepiece there is only one adjustment ring for the magnification change. The overall volume of the eyepiece can be kept small, so that a smaller adjustable eye spacing and a greater clearance for the nose are possible in the case of a binocular arrangement of the telescopes.

In the drawing, exemplary embodiments are illustrated schematically and will be described in more detail below using the figures, in which.

Figure 1:
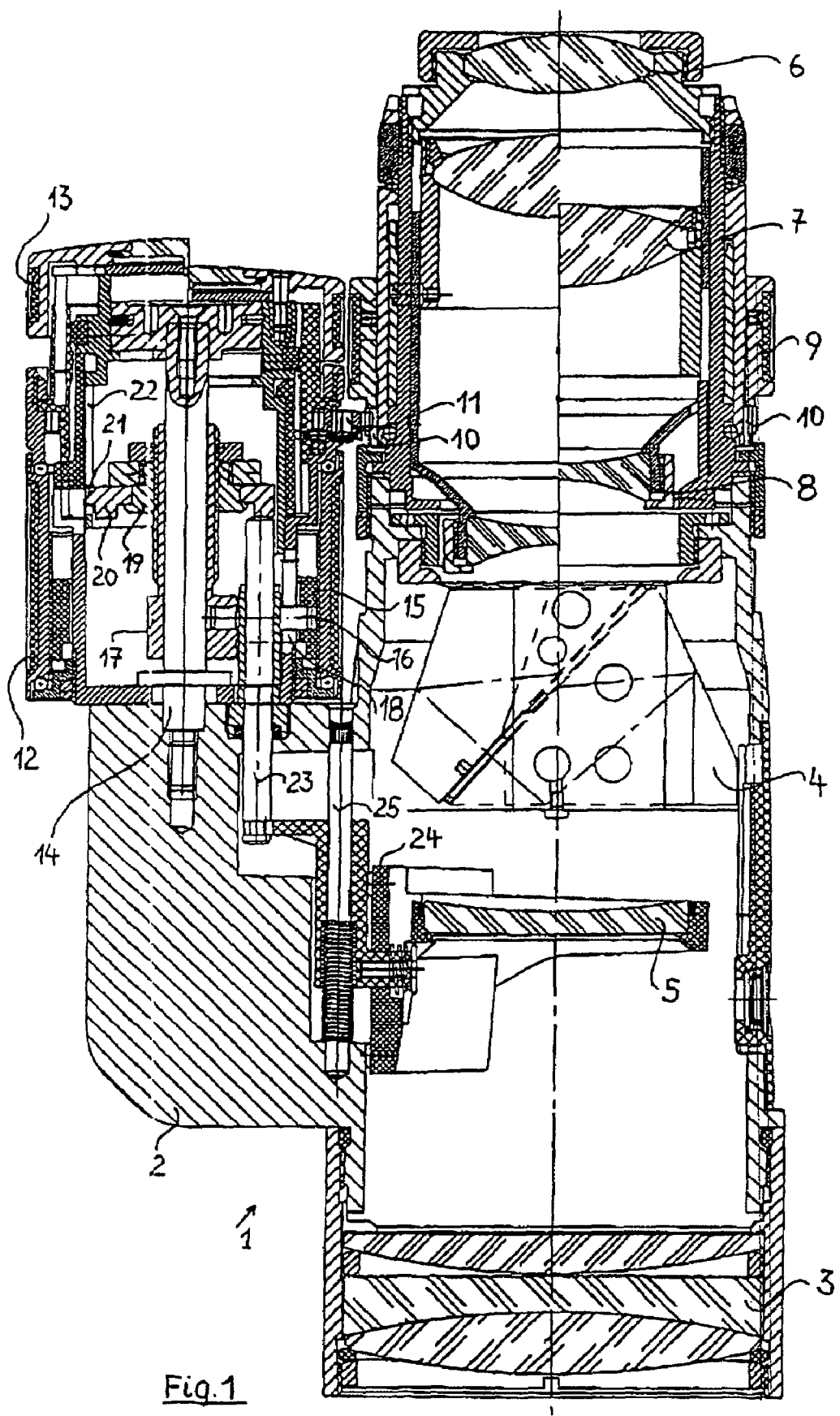
FIG. 1 shows a monocular telescope.

The monocular telescope 1 illustrated in FIG. 1 contains an objective 3 arranged fixedly in the housing 2, an inverting system 4 and an eyepiece. Assigned to the objective 3 is a focusing element 5, which is mounted in the housing 2 such that it can be displaced longitudinally. The eyepiece comprises an outer element 6 arranged fixedly in the housing 2 and two lens elements 7, 8 located internally, which are arranged such that they can be displaced with respect to each other. In the left-hand half of the sectional drawing, the adjustment of high eyepiece magnification is illustrated with the lens elements 7, 8 located far from each other and, in the right-hand half, the adjustment with a lower eyepiece magnification. The mutual displacement of the lens elements 7, 8 is effected by means of rotation on a magnification adjustment ring 9 and therefore coupled cam guides in the mounting sleeves for the lens elements 7, 8. The cam guides will not be described further, since such adjustments are generally known and are not the subject of the invention. The imaging correction of the eyepiece is optimized for the respective magnifications in the end positions illustrated. For this purpose, for example, an 8-fold and a 12-fold magnification are provided.

On the magnification adjustment ring 9 there is an outer toothed ring 10, in which a gear wheel 11 rotatably mounted on the housing 2 engages. The gear wheel 11 has a geared connection to the diopter adjustment, which will be described in more detail using FIG. 3.

A focusing adjustment ring 12 and a diopter adjustment ring 13 are mounted on the housing 2 such that they can be rotated about a common shaft 14. The diopter adjustment ring 13 in the illustration shown on the right is locked by a cylinder element 39 described in more detail later and can be unlocked by being pulled up. Further details can be gathered from FIG. 3.

A worm element 15 which can be moved in the direction of the shaft 14 is coupled to the focusing adjustment ring 12. The worm element 15 is connected via a pin 16 to a thrust element 17 mounted on the shaft 14 such that it can be displaced. The pin 16 is guided, in a manner known per se, in a longitudinal slot 18 fixed in position parallel to the shaft 14, so that, during rotation of the focusing adjustment ring 12, the worm element 15 is moved in the axial direction and, in the process, displaces the thrust element 17 along the shaft 14.

Adjustably connected to the thrust element 17 is a carrier element 19, on which a cam disk 20 is rotatably mounted. The cam disk 20 engages with a lug 21 in a slotted guide 22 which is connected to the diopter adjustment ring 13. When the diopter adjustment ring 13 is unlocked, the cam disk 20 can therefore be rotated about the shaft 14 by the lug 21 being carried along in the slotted guide 22.

Figure 4:
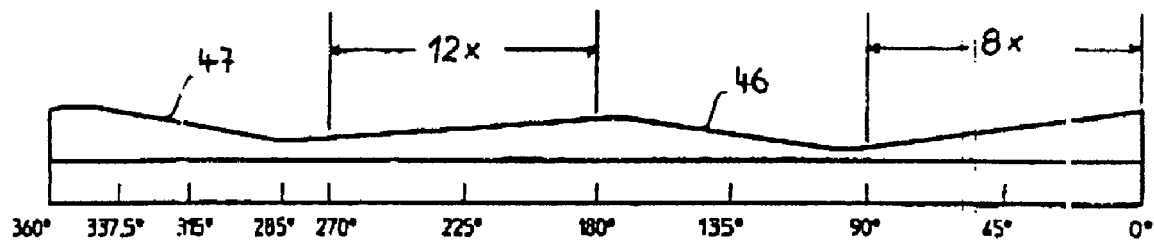
FIG. 4 shows a development of a cam disk.

The cam disk 20 bears with its controlling end face on a transmission rod 23 which, via an intermediate piece guided on a rod 25 and a pin integrally molded thereon in the radial direction, is connected to a holder 24 for the focusing element 5. Instead of a force-fitting contact between the cam disk 20 and the transmission rod 23, a form-fitting connection can also be provided. The holder 24 is pressed on the pin radially against the inner wall of the telescope 1 by a spring and is thus guided without play parallel to the shaft 14. During rotation of the cam disk 20 as a result of actuation of the unlocked diopter adjustment ring 13, the transmission rod 23 and thus the focusing element 5 are therefore adjusted in accordance with the respective height of the end face of the cam disk 20. A development of the height of the end face of the cam disk 20 is illustrated in FIG. 4. When the diopter adjustment ring 13 is locked to the focusing adjustment ring 12 again, the selected diopter adjustment is fixed.

When the diopter adjustment ring 13 is locked to the cylinder element 39, there is a geared coupling via the locking elements between the gear wheel 11 and the slotted guide 22. By means of rotation of the magnification adjustment ring 9 on the eyepiece, the cam disk 20 is therefore rotated into the position of the selected magnification and therefore displaces the focusing element 5 again via the transmission rod 23. The change in the height of the end face of the cam disk 20 corresponds to the value already explained. During actuation of the focusing adjustment ring 12, the setting of the cam disk 20, adjusted as a function of the magnification change, is maintained. As a result of the wide physical separation of the focusing adjustment ring 12 and of the diopter adjustment ring 13 from the magnification adjustment ring 9, inadvertent adjustment of the correct diopter compensation and of the focusing is ruled out.

Figure 2:
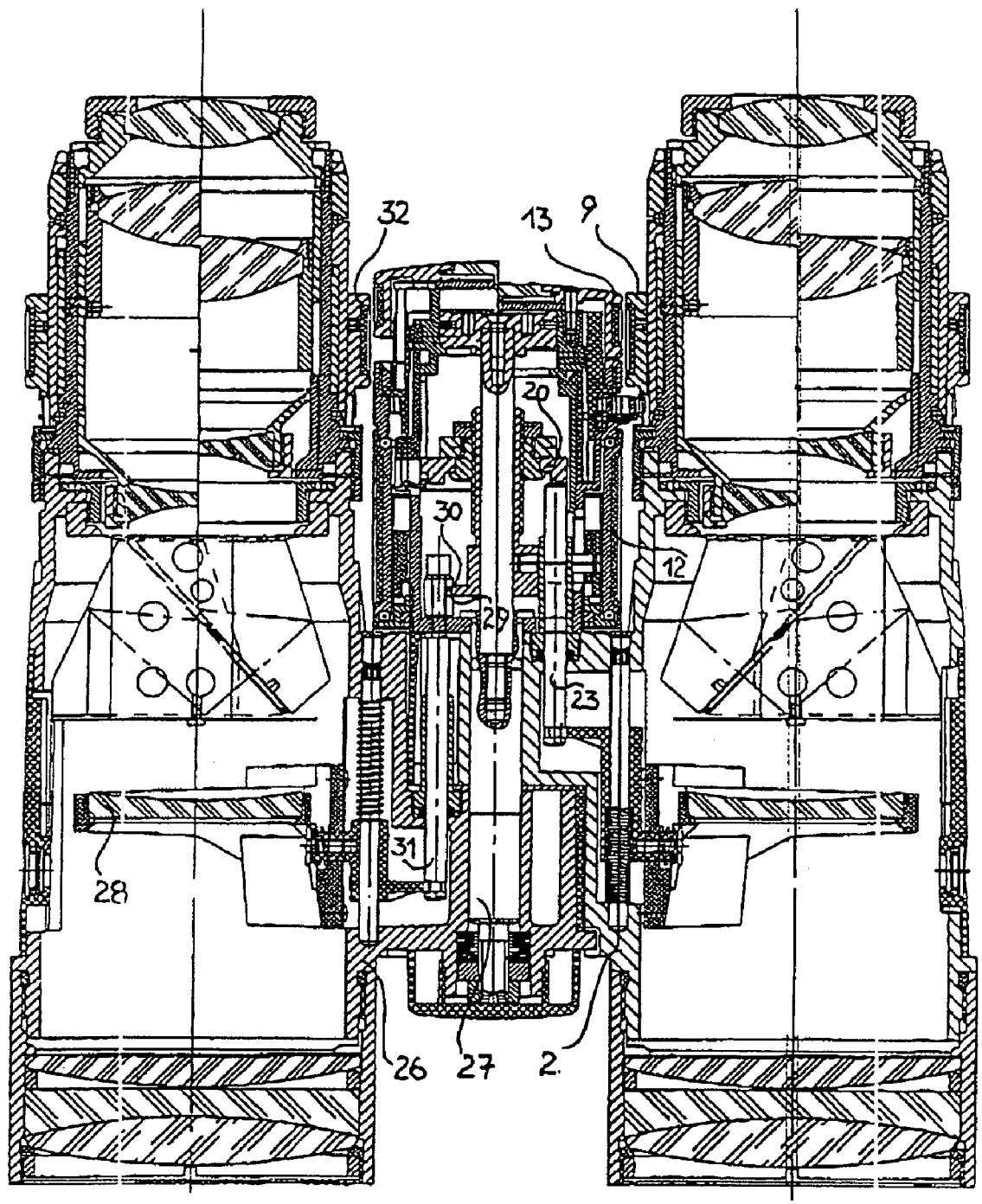
FIG. 2 shows a binocular telescope.

FIG. 2 shows a binocular telescope. Arranged on the housing 2 of the monocular part of the telescope 1 such that it can be pivoted is a second telescope housing 26 with the same optical construction. The pivot axis 27 is aligned with the shaft 14 of the focusing adjustment ring 12 and of the diopter adjustment ring 13, so that this part of the housing 2 forms the pivoting bridge of the binocular telescope.

In order to adjust a focusing element 28 in the second telescope housing 26, a driver 29 is added to the thrust element 17 and engages in a groove 30 at the upper end of a second transmission rod 31. The driver 29 is constructed in a manner known per se as a circular segment disk, so that the engagement with the transmission rod 31 is not interrupted during pivoting of the second telescope housing 26 in order to set the eye width. The rotation of the focusing adjustment ring 12 therefore acts synchronously on both focusing elements 5, 28.

For the purpose of sharp binocular imaging, in this exemplary embodiment, sharp imaging must first be adjusted to an object with the eye associated with the focusing element 28. Following subsequent unlocking of the diopter adjustment ring 13, the focusing element 5 can then be adjusted via the rotation of the cam disk 20 until any difference possibly present with respect to the visual acuity of the other eye is compensated for. After that, the diopter adjustment ring 13 must be locked again.

In order to change the eyepiece magnification, in the exemplary embodiment illustrated, both eyepieces have magnification adjustment rings 9, 32 which can be actuated independently of each other, optimum correction of the imaging performance being provided only in the end positions and the intention therefore also being for only these positions to be used for observation. In this exemplary embodiment, only the magnification adjustment ring 9 has a geared connection to the cam disk 20. For the purpose of secure adjustment of the magnification-dependent portion of the diopter adjustment, a safeguard is therefore provided, which permits the diopter adjustment ring 13 to be unlocked and locked only in the end positions of the magnification adjustment ring 9. The compensation for the difference in the visual acuity should preferably be performed in the position of the highest eyepiece magnification.

In this case, the cam disk 20 has on its circumference two segments with different heights and slopes which, firstly, are matched to a lower eyepiece magnification $\Gamma_1$ and, secondly, are matched to a higher eyepiece magnification $\Gamma_2$. This will be described in more detail using FIGS. 4 and 5. The transmission ratios between the toothed ring 10, the gear wheel 11 and in relation to the actuating element for the cam disk 20 are chosen such that, when the eyepiece magnification is changed over, the respectively associated segment is brought into contact with the transmission rod 23. In the case where there are two magnifications $\Gamma_1$, $\Gamma_2$ which can be changed over, a rotation of about 90° is preferably provided for the magnification adjustment ring 9 for the changeover in the magnification. The transmission ratio is set in such a way that, in the process, the cam disk 20 and also the diopter adjustment ring 13 are rotated through 180°.

In the case of a correction of the eyepiece for, for example, three or more discretely adjustable magnifications, correspondingly more segments can be provided and, on the basis of a matched transmission ratio of the actuating elements, can in each case be brought into the active position.

The relative displacement between the two focusing elements 5, 28, set in the manner described, takes into account both the difference in the visual acuity of the two eyes and the magnification-dependent value based on this of the diopter compensation. During subsequent synchronous adjustment of the focusing elements 5, 28 as a result of actuation of the focusing adjustment ring 12, the object respectively observed is seen sharply with both eyes.

Instead of manual actuation of the magnification adjustment rings 9, 32, it is possible to provide electromechanical adjustment. Then, via a central electronic pushbutton, synchronous adjustment of the eyepiece magnification can be triggered. In addition, the second transmission rod 31 can also be assigned an electromechanically driven second cam disk which effects a single magnification-dependent adjustment of the second focusing element 28. Given such an arrangement, after the difference in the visual power of both eyes has been compensated for once, the definition is maintained during each magnification change.

Figure 3:
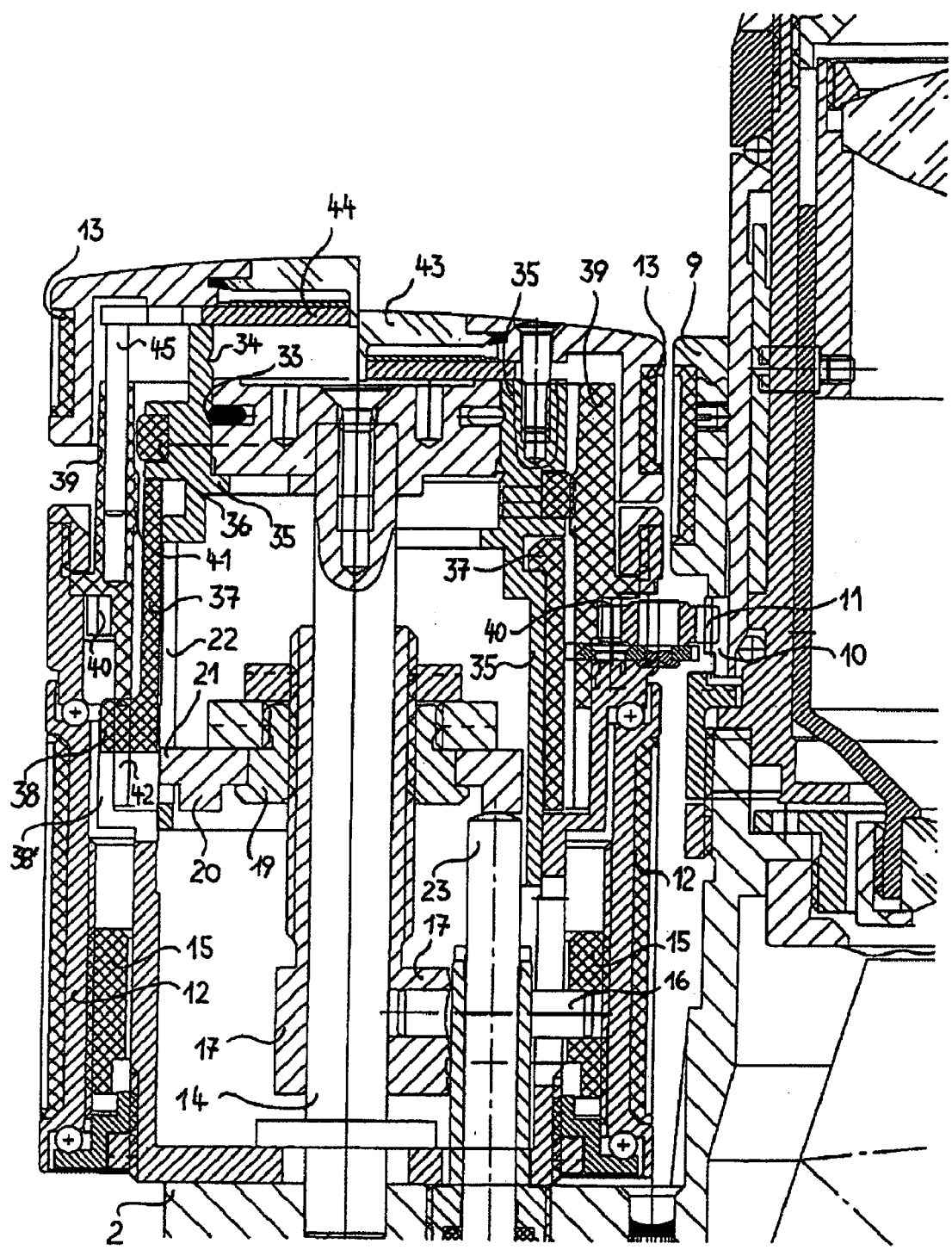
FIG. 3 shows an extract from the focusing and diopter adjusting mechanisms.

Details of the operative chains already described can be gathered from FIG. 3. The diopter adjustment ring 13 is shown in the unlocked state in the left-hand half of the sectional illustration and in the locked state in the right-hand half. Both adjustments are assigned latching positions 33, 34.

Connected to the diopter adjustment ring 13 is an inner cylinder element 35, in which the slotted guide 22 already described for the lug 21 on the cam disk 20 is arranged. Introduced into the cylinder element 35, at the upper end, is an outer toothing system 36 oriented parallel to the shaft 14. In addition, a sleeve 37 is rotatably mounted on the outer circumference of the cylinder element 35. Integrally molded on the sleeve 37, at the lower end, is a stop lug 38 which points outward and engages in a recess 38' in the housing 2 corresponding to the width of the stop lug 38.

An outer cylinder element 39 is inserted into the housing 2 such that it can rotate. Underneath the bearing edge for the cylinder element 39, the latter contains a toothed ring 40 which points outward and in which the gear wheel 11 engages. In addition, on the inner circumferential surface, a toothing system 41 is provided, which corresponds to the toothing system 36 of the inner cylinder element 35. In the unlocked, left-hand part of the illustration, the two toothing systems 36, 41 are disengaged and, in the locked, right-hand part of the illustration, engaged in each other. The lower edge of the cylinder element 39 includes, over part of its circumference, a ledge 42 corresponding to the height of the stop lug 38, on which the stop lug 38 bears during rotation of the cylinder element 39 on account of actuation of the magnification adjustment ring 9. On the boundary of the ledge 42, the cylinder element 39 in each case additionally has a slot oriented upward parallel to the shaft 14 and corresponding to the width of the stop lug 38. Only when the stop lug 38 is opposite this slot is it possible to unlock the diopter adjustment ring 13. During the unlocking action, the lug 21 on the cam disk 20 slides in the slotted guide 22.

In the unlocked state, rotation of the outer cylinder element 39 and therefore of the magnification adjustment ring 9 is not possible, because of the stop lug 38 fixed in the housing 2. In the locked state, on the other hand, rotation of the outer cylinder element 39 is transmitted directly to the inner cylinder element 35 via the toothing system 36, 41, the cam disk 20 being rotated at the same time via the lug 21 located in the slotted guide 22.

The carrier element 19 for the cam disk 20 can be adjusted vertically on the thrust element 17 and secured by a locking screw fixing. In this case, the cam disk should be brought into the zero position via the diopter adjustment ring 13 at a specific magnification setting. The focusing element 5 should be aligned for afocal imaging of the overall system.

In its top side, the diopter adjustment ring 13 has a viewing window 43 and, on the edge thereof, a diopter scale, not illustrated. Underneath the viewing window 43, a pointer disk 44 is placed rotatably on the inner cylinder element 35 and coupled to the outer cylinder element 39 via a tab 45. When the diopter adjustment ring 13 is unlocked, the pointer disk 44 is raised as well and, at the same time, the tab 45 slides in a corresponding recess in the outer cylinder element 39.

The diopter adjustment results in relative rotation of the inner cylinder element 35 with respect to the outer cylinder element 39, that is to say the diopter scale is rotated with respect to the pointer disk 44 which, in the process, is firmly held by the outer cylinder element 39 via the tab 45. Because of the pointer disk 44 always being located immediately under the viewing window 43, no parallax errors arise when reading the adjusted diopter compensation.

The locking of the magnification adjustment ring 9, already described, means that changing over the eyepiece magnifications can be carried out only with the diopter adjustment ring 13 locked. The rotation transmitted to the outer cylinder element 39 during the changeover also effects rotation of the diopter adjustment ring 13, so that the diopter scale and the pointer disk 44 are corotated synchronously. The two segment regions of the cam disk 20 which are associated with the different magnifications have the same cam length for the same diopter adjustments. For the diopter display on the diopter adjustment ring 13, the result is thus the same scale spread, so that only a single diopter scale is necessary.

The cam regions of the end face of the cam disk 20, offset by 180° in relation to each other, can be seen from the vertical development H illustrated in FIG. 4. The angular range from 0° to 90° is intended to be provided for the diopter adjustment at $\Gamma_1=8$-fold eyepiece magnification, and the angular range from 180° to 270° for the diopter adjustment at $\Gamma_2=12$-fold eyepiece magnification. Since diopter compensation is needed for ± values, the height values H at 45° and 225° correspond to the zero position. The heights H are equal at these points. The transition between the cam regions is configured such that the cam disk can slide along on the transmission rod 23 without jumping during its rotation for the magnification change.

Figure 5:
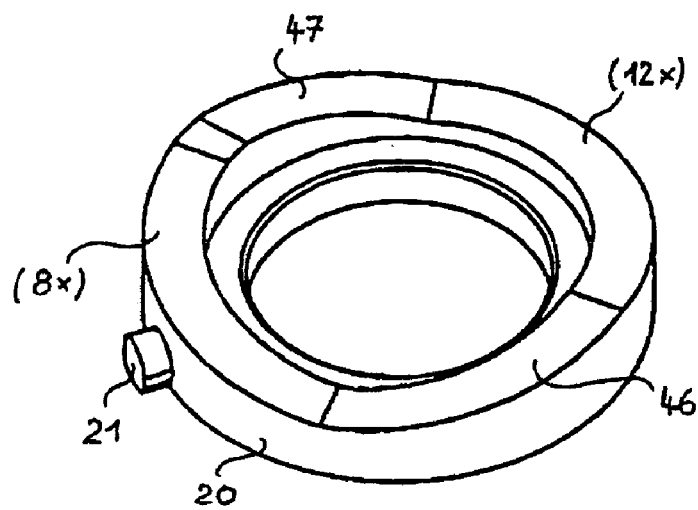
FIG. 5 shows a view of the cam disk.

FIG. 5 shows a view of the closed cam disk 20 with the integrally molded lug 21. The two cam regions of different slope for the two selected magnifications 8× and 12× can clearly be seen. Located between them are a transition region 46 and a region 47 which is not used because of the rotational range of the outer cylinder element 39 being limited by the ledge 42 and the stop lug 38.

LIST OF DESIGNATIONS

1 Telescope
2 Housing
3 Objective
4 Inverting system
5 Focusing element
6 Outer element of the eyepiece
7, 8 Displaceable lens elements
9 Magnification adjustment ring
10 Outer toothed ring
11 Gear wheel
12 Focusing adjustment ring
13 Diopter adjustment ring
14 Shaft
15 Worm element
16 Pin
17 Thrust element
18 Longitudinal slot
19 Carrier element
20 Cam disk
21 Lug
22 Slotted guide
23 Transmission rod
24 Holder
25 Rod
26 Second telescope housing
27 Pivot axis
28 Second focusing element
29 Driver
30 Groove
31 Second transmission rod
32 Second magnification adjustment ring
33, 34 Latching positions
35 Inner cylinder element
36 Toothing system
37 Sleeve
38 Stop lug
38' Recess in the housing 2
39 Outer cylinder element
40 Toothed ring
41 Toothing system
42 Ledge
43 Viewing window
44 Pointer disk
45 Tab
46 Transition region
47 Unused region

The invention claimed is:

1. A telescope having an objective and a focusing element associated with the objective and displaceable by a focusing adjustment ring, wherein the basic position of the focusing element is adjustable by a lockable diopter adjustment ring, and comprising an inverting system and an eyepiece with a variable magnification, wherein the diopter adjustment ring engages a cam disk for adjusting the focusing element in such a way that, on the basis of a change in the eyepiece magnification, the cam disk is adjusted by a value dependent on the diopter adjustment and on the magnification change.

2. The telescope as claimed in claim 1, wherein the cam disk is formed as a face cam, whose end face bears on a transmission rod for adjusting the focusing element.

3. The telescope as claimed in claim 1, wherein there is a form-fitting connection between the cam disk and a transmission rod.

4. The telescope as claimed in claim 2, wherein the cam disk is coupled to a magnification adjustment ring for changing the eyepiece magnification, in such a way that an adjustment of the cam disk takes place only when the diopter adjustment ring is locked as a result of actuation of the magnification adjustment ring.

5. The telescope as claimed in claim 4, wherein a locking means is provided which blocks rotation of the magnification adjustment ring when the diopter adjustment ring is unlocked.

6. The telescope as claimed in claim 2, wherein the eyepiece with a variable magnification is an eyepiece with a discretely adjustable magnification, and wherein each magnification adjustment is assigned a segment region of the cam disk, which is brought into an operative position with respect to the transmission rod via a magnification adjustment ring, for the magnification-dependent diopter adjustment.

7. The telescope as claimed in claim 6, wherein unlocking of the diopter adjustment ring to change the basic position of the focusing element is provided only in positions of the magnification adjustment ring associated with discrete magnifications.

8. The telescope as claimed in claim 6, wherein the segment regions of the cam disk are equally long for all the adjustable eyepiece magnifications.

9. A binocular telescope having two telescopes connected via a hinged bridge, as claimed in claim 1, the focusing adjustment ring and the diopter adjustment ring being rotatably mounted in alignment with the pivot axis of the hinged bridge, wherein the cam disk bears on a transmission rod of one telescope, which is rigidly connected to the hinged bridge, and a magnification adjustment ring associated with this telescope is coupled to the cam disk when the diopter adjustment ring is locked.

10. The binocular telescope as claimed in claim 9, wherein outwardly pointing lens elements of the objective and of the eyepiece are arranged in a fixed manner.

* * * * *